United States Patent [19]

Pillon

[11] 4,013,192
[45] Mar. 22, 1977

[54] PILL COUNTER

[75] Inventor: Austin E. Pillon, Sandwich West, Canada

[73] Assignee: ITL Industries, Inc., Newark, Ohio

[22] Filed: Feb. 18, 1976

[21] Appl. No.: 658,984

[30] Foreign Application Priority Data

May 5, 1975 United Kingdom ............ 18766/75

[52] U.S. Cl. .................................. 221/7; 221/186; 53/59 R; 53/78
[51] Int. Cl.² .................. B65G 47/44; B65B 57/20
[58] Field of Search ............ 221/2, 7, 12, 186, 209, 221/258, 277, 312 R; 53/59, 78; 133/8 R; 193/31 R, 31 A

[56] References Cited

UNITED STATES PATENTS

| 2,059,398 | 11/1936 | Roemer | 193/31 R X |
| 2,235,286 | 3/1941 | Cookson | 193/31 R X |
| 2,873,883 | 2/1959 | Schweiter | 221/186 X |
| 3,386,618 | 6/1968 | Gilbert | 221/12 |
| 3,746,211 | 7/1973 | Burgess | 221/7 |
| 3,837,139 | 9/1974 | Roseberg | 221/7 X |

*Primary Examiner*—Robert B. Reeves
*Assistant Examiner*—Joseph J. Rolla
*Attorney, Agent, or Firm*—Reising, Ethington, Barnard, Perry & Brooks

[57] ABSTRACT

A pharmaceutical pill counter incorporating a rotating pill bowl and a stationary guide that cooperatively guide pills in single file to an exposed slide having a main portion that feeds prescription and stock bottle slide portions under the control of a gate. Each slide portion has a downwardly inclined orientation with an exposed channel shape to guide the pills downwardly while permitting the slide portions to be easily cleaned. The slide is preferably integrally defined by an upper housing portion of molded plastic and is located at a corner of the housing so that the prescription and stock bottle slide portions direct the pills to opposite sides of the corner. The gate includes a lower end pivotally mounted at a lower extremity of a common junction of the slide portions and an upper end that is moved along an upper extremity of this junction to direct the pills in the proper direction. The gate initially directs the pills to the prescription bottle slide portion until a photoelectric sensor along the main slide portion has sensed a programmed number of pills and then directs the remaining pills to the stock bottle slide portion. The rotating bowl and stationary guide are preferably molded from plastic and the guide includes a central hole that receives a removable upper end of a bowl drive shaft. A portion of the guide projects into the main slide portion to prevent rotation of the guide as the drive shaft rotates the bowl. A removable plastic shield is positioned over the slide and includes lower deflector portions that control the trajectory of pills as they leave the slide.

13 Claims, 3 Drawing Figures

PILL COUNTER

BACKGROUND OF THE INVENTION

1. Field of the Invention

The present invention relates to pill counters for use by druggists or pharmacists in dispensing a predetermined number of pills, capsules, or tablets into a prescription bottle from a stock bottle and for then returning the remaining pills back to a stock bottle.

2. Description of the Prior Art

Gilbert U.S. Pat. No. 3,386,618 discloses an apparatus for arranging and counting small objects such as pills. The apparatus therein disclosed may be utilized by pharmacists and others for dispensing a predetermined number of pills, capsules, or tablets into containers such as vials or bottles. Devices of this general type are also disclosed in U.S. Pat. Nos. 792,918; 3,206,062; 3,290,488; 3,677,437; 3,746,211; and 3,837,139.

SUMMARY OF THE INVENTION

The present invention is concerned with a pill counter including a housing supporting a rotatable bowl having a lower portion receiving pills from a stock bottle and an intermediate annular ledge to which pills are guided in single file by a stationary guide as well as an upper edge over which the guide also directs the pills to a slide which includes slide portions of an exposed channel shape that are readily cleaned to maintain the pill counter in a sanitary condition. The slide includes an upper main portion that receives the pills from the rotating bowl and prescription bottle and stock bottle portions that meet with the main portion at a common junction. A gate mounted at the junction of the slide portions directs the pills to the prescription bottle until a sensor has counted a predetermined number of the pills and the gate is then moved to direct the rest of the pills back to the stock bottle from which they are initally poured into the bowl.

In the preferred embodiment of the pill counter, the stationary pill guide includes a portion that projects over the upper edge of the bowl into the main slide portion to prevent rotation of the guide about a central bowl drive shaft which has an upper end projecting upwardly through the pill bowl into a hole in the guide. The upper shaft end is provided by a detachable bolt that may be unthreaded to remove the guide during cleaning of the counter.

An upper housing portion of the disclosed pill counter is molded from plastic and includes a bowl depression that receives the rotatable bowl. The upper housing portion has a rectangular configuration when viewed in the vertical direction and one corner thereof integrally defines the slide that directs the pills from the bowl to either the prescription or stock bottle. The gate which directs the pills along the slide has a lower end that is pivotally mounted at a lower extremity of the junction between the slide portions and an upper end that moves along an upper extremity of the slide portion junction. The gate is initially positioned to direct the pills to the prescription bottle slide portion and a photoelectric sensor counts the number of pills that have passed through the main slide portion to actuate gate movement that subsequently directs the remaining pills to the stock bottle slide portion after a programmed number of pills have been directed to the prescription bottle. A visual readout display on the upper housing portion is also connected to the sensor to provide a readout of the pills as they are counted.

The housing of the pill counter also includes a lower portion that opens upwardly as well as an intermediate support plate located between the upper and lower housing portions. An electric motor drive assembly is suspended from the intermediate support plate and drives the bowl drive shaft to provide the bowl rotation. The electric motor of the drive assembly is cooled by a fan that receives air through apertures of the lower housing portion. Movable brackets supported on the lower housing portion may be utilized to carry bottle funnels that direct pills from the prescription and stock bottle slide portions into adjacent prescription and stock bottles. A removable shield that covers the slide is held in place by a magnet and is molded from plastic. This sheild includes lower deflector portions that control the trajectories of the pills as they leave the prescription and stock bottle slide portions. The shield also helps in maintaining the slide sanitary during counting of the pills. A removable bowl cover molded from plastic is supported by the upper housing portion over the bowl depression to cover the bowl during use and periods of non-use and thereby further maintains the sanitary condition of the bowl and the pill guide received within the bowl.

Accordingly, objects of the invention are to provide improved apparatus for counting and dispensing pills or the like; to provide such improved apparatus which is easily cleaned to maintain a sanitary condition; to provide the improved apparatus with components that are removable to aid in the ease of cleaning; to provide a pill counter that operates rapidly and accurately to dispense a predetermined number of pills into a prescription container and to then return the remaining pills to a stock container.

Other objects, features, and advantages of the present invention are readily apparent from the following detailed description of the preferred embodiment taken in connection with the accompanying drawings.

DETAILED DESCRIPTION OF THE PREFERRED EMBODIMENT

Figure 1:
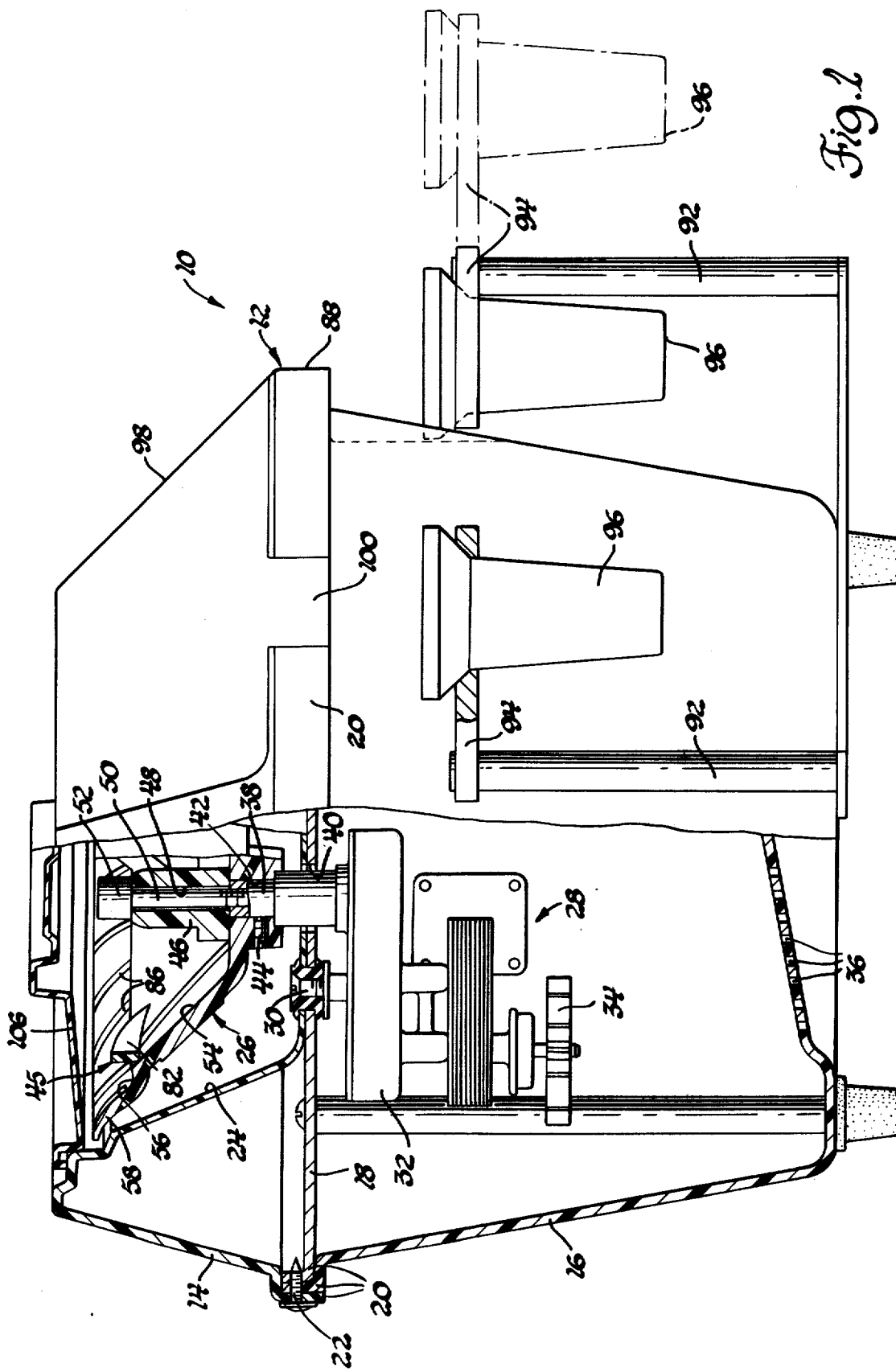
FIG. 1 is a partially sectioned elevation view of a pill counter embodying the present invention as viewed along line 1—1 of FIG. 2.

Referring to FIG. 1 of the drawings, a pill counter embodying the present invention is collectively indicated by reference numeral 10 and includes a housing 12 having an upper molded plastic portion 14, a lower molded plastic portion 16, and an intermediate support plate 18 located between downwardly and upwardly opening configurations of the upper and lower housing portions. Peripheral flanges 20 of the housing portions 14 and 16 and the support plate 18 are secured to each other by a plurality of spaced fasteners 22 (see FIG. 3 also). The upper housing portion 14 defines a bowl depression 24 that receives a rotatable pill bowl 26. Bowl 26 is preferably molded from plastic, and has a circular configuration as viewed in FIG. 2.

The pill bowl 26 is located above an electric motor drive assembly 28 suspended on the support plate 18 of the housing by a plurality of screws 30, only one of which is shown. The drive assembly 28 includes an electric motor 32 which is cooled by a fan 34 receiving air through bottom apertures 36 in the lower housing portion 16. The bottom extremity of this lower housing portion may also be provided with a suitable screen through which the cooling air is received. The motor 32 also includes a reduction gear drive train that drives an output drive shaft 38 which projects upwardly through aligned apertures 40 in the housing support plate 18 and the bottom extremity of the bowl depression 24. This shaft 38 is received within a central hole 42 in the bowl 26 and is rotatably fixed to the bowl by a set screw 44.

Figure 2:
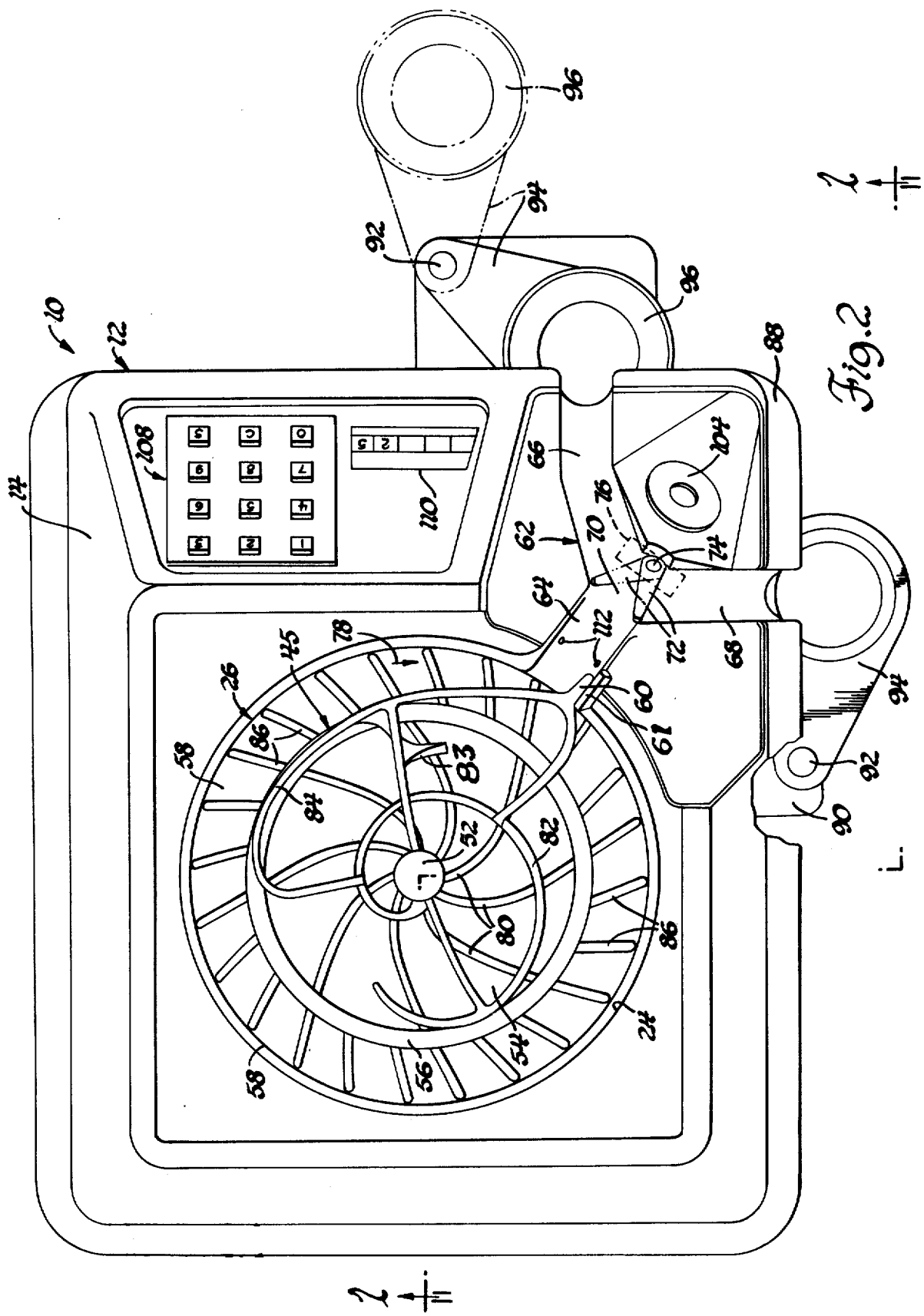
FIG. 2 is a top plan view of the pill counter shown in FIG. 1.

The pill bowl 26 receives a molded plastic guide 45, see FIG. 2, that has a central hub 46 shown in FIG. 1. A central hole 48 of the hub receives a threaded bolt 50 that is threaded into the shaft 38 so as to constitute an upper end of the shaft. The bolt 50 includes a head 52 that prevents upward movement of the guide hub 46.

With reference to FIGS. 1 and 2, the pill bowl 26 includes a lower portion 54 that receives pills from a stock bottle, an annular ledge 56 above the lower portion, and an upper inclined edge 58 defining the periphery of the bowl. The pill guide 45 includes a tongue or stop portion 60 the projects into a slide 62 at the upper end of a main portion 64 of the slide. The tongue portion 60 is engageable with a stop edge 61 at the upper inlet end of the slide 62 to guide pills into the slide and to prevent rotation of the guide 45 during clockwise rotation of the bowl (as viewed in FIG. 2). The main portion 64 of the slide feeds prescription and stock bottle slide portions 66 and 68 that have a common junction 70 with the main portion. A gate 72 has a lower end that is pivotally supported by a pin 74 at the lower extremity of the slide portion junction 70 and an upper end that moves along the upper extremity of the junction so that the gate directs the pills to either slide portion 66 or 68 depending on whether the gate is in its solid or phantom line position of FIG. 2. A solenoid 76 shown by hidden lines in FIG. 2 moves the gate 72 between its two positions.

The bowl 26 rotates closkwise in the direction shown by arrow 78 of FIG. 2 to commence counting of pills received within the lower bowl portion 54. The projecting guide portion 60 is engaged with one side of the main slide portion 64 during the clockwise bowl rotation to maintain pill guide 45 in a stationary condition against rotation. Spiraling ribs 80 of the lower bowl portion and a spiraling guide portion 82 that slidably engages the ribs 80 cooperate to guide the pills received within the lower bowl portion upwardly to the intermediate annular ledge 56. A limiting guide portion 83, FIG. 2, also engages the spiraling ribs 80 of the lower bowl portion and cooperates with the guide portion 82 to limit the movement of pills upwardly onto ledge 56. The pills are moved clockwise between guide portions 82 and 83 upwardly onto the annular ledge 56 and are then moved clockwise past the stationary spiraling guide portions 82 as the bowl continues to rotate. After moving clockwise past guide portion 82, the inclined configuration of the upper bowl edge 58 and the cooperable bias of gravity prevent the pills from moving other than in a single file progression as the bowl rotates clockwise and moves the pills toward another spiraling portion 82 of pill guide 45. Spiraling ribs 86 on the inclined bowl edge 58 and the stationary guide portion 84 cooperate to move the pills upwardly in a single file progression toward the upper end of the main slide portion 64. Only one pill at a time is thus received by the slide 62 so that counting of the pills being dispensed may take place.

The slide 62 is defined by the upper plastic housing portion 14 at one corner 88 of the rectangular configuration that is defined by the upper housing portion when viewed in the vertical direction of FIG. 2. The prescription bottle side portion 66 directs pills downwardly on one side of the corner 88 and the stock bottle slide portion 68 directs pills downwardly on the other side of this corner. Each of the slide portions 64, 66 and 68 has a downwardly inclined orientation with an exposed channel shape so that pills will slide downwardly and be guided therethrough while still permitting the slide portions to be easily cleaned to maintain the counter in a sanitary condition.

Figure 3:
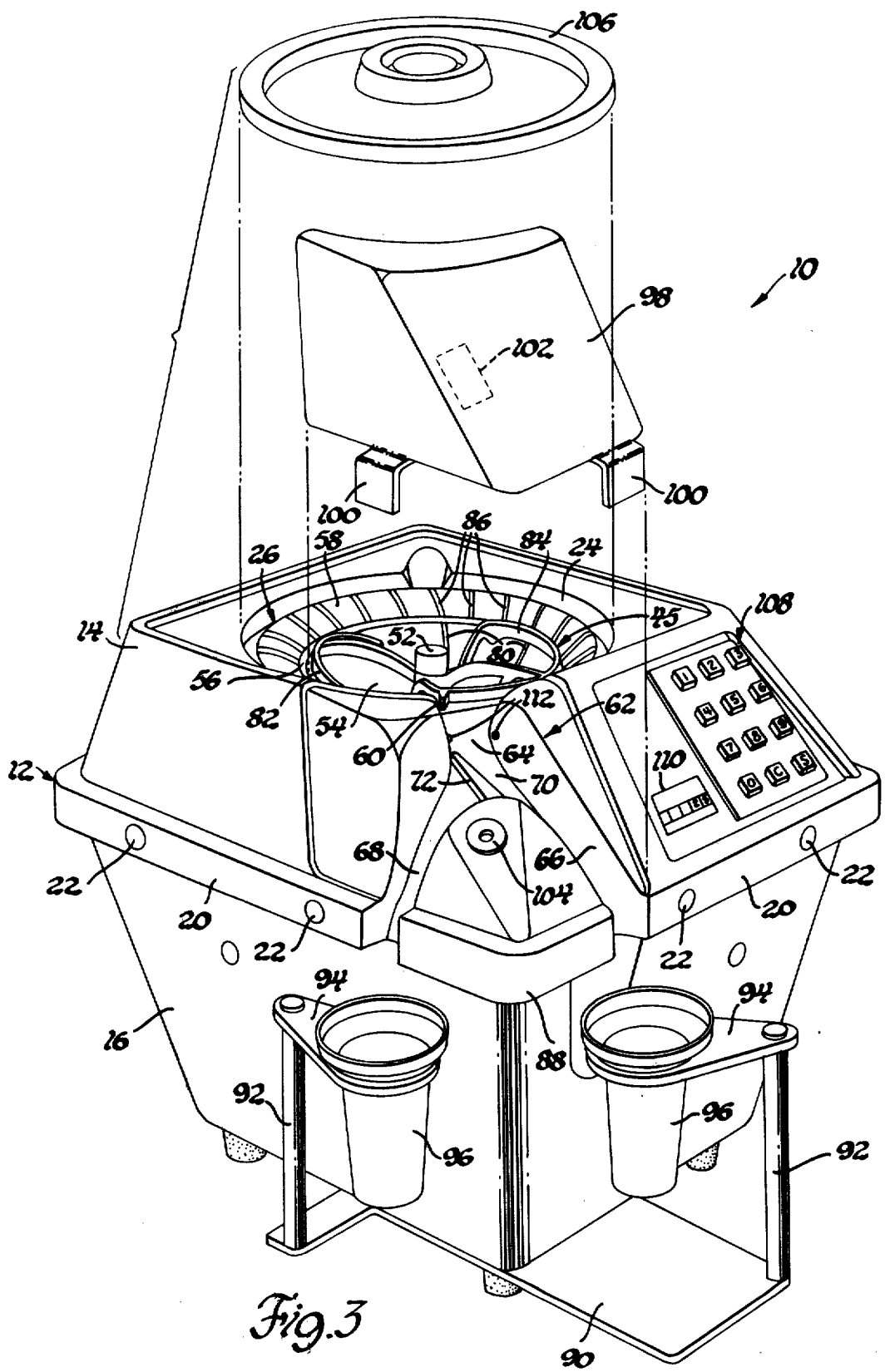
FIG. 3 is a perspective view of the pill counter of FIGS. 1 and 2 with a cover and shield thereof shown in exploded positions.

As shown in FIG. 3, a plate 90 is mounted on the bottom of the lower housing portion 16 below the corner 88 of the upper housing portion that defines the slide 62. Vertical pins 92 have lower ends secured to the plate 90 and upper ends that support movable brackets 94 for movement about general vertical axes. The brackets 94 include apertures that receive container holders or funnels 96 to direct the pills from the slide portions 66 and 68 into relatively small size vials or bottles. When larger vials are utilized, the funnels may be placed directly within the openings thereof and, in some instances, the size of the bottle opening is sufficient to eliminate the requirement of such funnels. In such cases, the brackets 94 are pivoted about their associated pins 92 away from the slide portions 66 and 68, such as shown by the phantom line position of the one bracket 94 in FIG. 2.

The trajectories of the pills as they leave the slide portions 66 and 68 are controlled by a molded plastic shield 98, FIGS. 1 and 3, that has lower deflector portions 100. A magnet 102 that is mounted on shield 98 and shown by hidden lines in FIG. 3 is engaged with a metal washer 104 on the upper housing portion 14 to position the shield so that deflector portions 100 prevent pills from flying outwardly over the adjacent bottle funnels as they leave the slide portions 66 and 68. The sheild 98 also helps in maintaining the counter in a sanitary condition after it has been cleaned. A removable molded plastic bowl cover 106 is supported on the upper housing portion 14 at the periphery of the bowl depression 24 and also helps in maintaining the counter in a sanitary condition.

With reference to FIGS. 2 and 3, a panel 108 of the counter has numerical buttons that are depressed to program suitable electric circuitry of the machine in order to count out a predetermined number of pills into a prescription bottle. This predetermined number of pills is indicated by a visually observable readout 110 adjacent panel 108. A count button C is then depressed to energize the drive assembly 28, FIG. 1, and thereby begin rotation of bowl 26 to provide the single file progression of the pills to the slide 62 in the manner previously described. A photoelectric sensor 112, FIGS. 2 and 3, senses and counts the pills upon passage through the main slide portion 64 above the gate 72. At this time, the gate 72 will be in its solid line position of FIG. 2 so that the pills will be directed toward the prescription bottle slide portion 66 and received by a prescription bottle. After the programmed number of pills have been dispensed into the prescription bottle, the electrical circuitry of the counter causes its solenoid 76, FIG. 2, to pivot the gate 72 from its solid line position to its phantom line position so that the remaining pills entering the slide will be directed toward the stock bottle slide portion 68 and thereby returned to the stock bottle position below this slide portion. At any time during the counting cycle, a stop button S of the panel 108 may be depressed to terminate the operation of the counter. Also, it is preferable for the electrical sensing system to terminate the operation of the counter after a predetermined period of time, such as 25 seconds, has past since the photoelectric sensor last sensed a pill passing through the slide. A photoelectric sensing system of this general type is disclosed by U.S. Pat. No. 3,837,139.

The removable bowl cover 106 may be removed between counting operations to provide cleaning of the pill bowl 26. To make this cleaning easier, the bolt head 52 is rotated to unthread the bolt 50 from the shaft 38 and to thereby enable the pill guide 45 to be removed from the bowl.

While a preferred embodiment of the pill counter has herein been described, those skilled in the art will recognize various alternative embodiments and designs for practicing the present invention as defined by the following claims.

I claim:

1. Apparatus for counting and dispensing pills and the like comprising: a housing; a vertical shaft rotatably mounted in said housing; a pill bowl fixedly mounted on said shaft for rotation therewith; said bowl having a lower portion for receiving pills from a stock bottle, an intermediate annular ledge above the lower bowl portion, and an upper annular edge above the annular ledge; means for selectively rotating said bowl; a stationary guide received within the bowl to guide the pills from the lower bowl portion upwardly to the annular ledge during bowl rotation and then along the ledge in single file and upwardly over the upper annular edge, said stationary guide having a central hub rotatably receiving said vertical shaft; a head detachably mounted in said shaft at the upper end thereof for engaging said hub and preventing axial displacement of said guide from said shaft, an exposed, generally Y-shaped slide on the housing including a main slide portion for receiving the pills guided over the bowl edge and a pair of branch slide portions constituting prescription bottle and stock bottle slide portions; said branch slide portions having a common junction with the main slide portions so as to receive pills therefrom and to guide the pills to prescription or stock bottles, respectively; each of said slide portions having an exposed channel shape with a bottom wall and a pair of side walls with the bottom walls of said branch portions being continuous with the bottom wall of the main slide portion from said common junction to permit the slide portions to be cleaned with a continuous wiping motion; each of said slide portions having a downwardly inclined orientation with an exposed channel shape so pills slide downwardly therethrough in a guided manner during use of the apparatus; means defining a stop edge at the inlet end of said main slide portion; said guide having a tongue portion that projects over the edge of said bowl into engagement with said stop portion to prevent rotation of said guide during rotation of said bowl and vertical shaft; a gate mounted at the common junction of the main slide portion with the prescription and stock bottle slide portions so as to selectively guide the pills from the main slide portion to either the stock or prescription bottle slide portion; and control means for sensing the number of pills that have passed through the main slide portion and for positioning the gate to guide the pills to the prescription bottle slide portion until a predetermined number of pills have been sensed and then to the stock bottle slide portion.

2. Apparatus as claimed in claim 1 wherein the bowl and the guide are each molded from plastic.

3. Apparatus as claimed in claim 1 wherein the housing includes a lower apertured portion and the rotating means includes an electric motor and a fan received within the lower housing portion so the fan draws air through the lower apertured housing portion to cool the motor.

4. Apparatus as claimed in claim 1 wherein the housing includes an upper portion of molded plastic that integrally defines the slide.

5. Apparatus as claimed in claim 4 wherein the upper housing portion includes a corner at which the slide is located, the prescription bottle slide portion directing pills downwardly at one side of the corner, and the stock bottle slide portion directing pills downwardly at the other side of the corner.

6. Apparatus as claimed in claim 1 wherein the junction of the slide portions includes a lower extremity where the prescription and stock bottle slide portions meet each other and an upper extremity where the main side portion meets the prescription and stock bottle slide portions, the gate having a lower end pivotally mounted at the lower extremity of the junction of the slide portions and an upper end movable along the upper extremity of said junction so as to direct the pills to either the prescription or stock bottle slide portions, and the control means including a photoelectric sensor for counting the pills sliding along the main slide portion above the upper end of the gate.

7. Apparatus as claimed in claim 6 wherein the housing includes a readout display for the pills being sensed upon passage through the main slide portion.

8. Apparatus for counting and dispensing pills and the like comprising: a housing; a pill bowl mounted on the housing for rotation about a generally vertical axis; said bowl having a lower portion for receiving pills from a stock bottle, an intermediate annular ledge above the lower bowl portion, and an upper annular edge above the annular ledge; means for selectively rotating said bowl; a stationary guide received within the bowl to guide the pills from the lower bowl portion upwardly to the annular ledge during bowl rotation and then along the ledge in single file and upwardly over the upper annular edge; an exposed slide on the housing including a main slide portion for receiving the pills guided over the bowl edge and prescription bottle and stock bottle slide portions having a common junction with the main slide portion so as to receive pills therefrom and to guide the pills to prescription to stock bottles, respectively; each of said slide portions having a downwardly inclined orientation with an exposed channel shape so pills slide downwardly therethrough in a guided manner during use of the apparatus while permitting the slide portions to be easily cleaned; a gate mounted at the common junction of the main slide portion with the prescription and stock bottle slide portions so as to selectively guide the pills from the main slide portion to either the stock or prescription bottle slide portion; control means for sensing the number of pills that have passed through the main slide portion and for positioning the gate to guide the pills to the prescription bottle slide portion until a predetermined number of pills have been sensed and then to the stock bottle slide portion; said stationary guide including a portion that projects over the upper bowl edge into the main slide portion; the housing including an upper portion of molded plastic that integrally defines the slide; the upper housing portion including a corner at which the slide is located, the prescription bottle slide portion directing pills downwardly at one side of the corner, and the stock bottle slide portion directing pills downwardly at the other side of the corner; and a manually removable molded plastic shield for the slide, said shield having deflector portions for controlling the trajectory of the pills upon leaving the prescription bottle and stock bottle slide portions.

9. Apparatus as claimed in claim 8 which includes movable brackets for mounting funnels below the prescription bottle and stock bottle slide portions.

10. Apparatus as claimed in claim 8 which includes a magnet for holding the shield in position on the corner of the upper housing portion.

11. Apparatus as claimed in claim 8 which also includes a removable molded plastic cover for the bowl.

12. Apparatus for counting and dispensing pills and the like comprising: a housing including a lower upwardly opening portion of molded plastic, an upper portion of molded plastic mounted on top of the lower portion and including an upwardly opening bowl depression, and a support plate located between the upper and lower housing portions; a pill bowl mounted within the depression of the upper housing portion and including a lower portion for receiving pills from a stock bottle and having a central opening, an intermediate annular ledge above the lower bowl portion, and an upper annular edge above the annular ledge; an electric motor drive assembly suspended from the housing support plate and including a generally vertical output shaft received within the central opening of the bowl and rotatably fixed to the bowl so as to provide bowl rotation upon energization of the drive assembly, said output shaft including a threaded bolt secured thereto to provide an upper end thereof that projects upwardly into the bowl; a molded plastic stationary guide including a central hole receiving the bolt, spiral guiding portions for guiding pills upwardly to the annular ledge during bowl rotation so as to move on the ledge in single file and for guiding the pills from the ledge upwardly over the bowl edge, and a positioning portion extending outwardly over the bowl edge; said upper housing portion having a corner defining an exposed slide including a main slide portion for receiving the pills guided over the bowl edge and for receiving the positioning portion of the guide to prevent rotation of the guide, and prescription bottle and stock bottle slide portions having a common junction with the main slide portion and respectively directing pills to opposite sides of said corner; each of said slide portions having a downwardly inclined orientation with an exposed channel shape so pills slide downwardly therethrough in a guided manner during use of the apparatus while permitting the slide portions to be easily cleaned; said junction of the slide portions having a lower extremity where the prescription and stock bottle slide portions meet each other and an upper extremity where the main slide portion meets the prescription and stock bottle slide portions; a gate having a lower end that is pivotally mounted at the lower extremity of the slide portion junction and an upper end that moves along the upper extremity of the slide portion junction to direct pills from the main slide portion to either the prescription bottle or stock bottle slide portion; control means for sensing the number of pills that have passed through the main slide portion and for positioning the gate to guide the pills to the prescription bottle slide portion until a predetermined number of pills have been sensed and then to the stock bottle slide portion; a removable shield for mounting on the upper housing portion corner defining the slide and including lower deflector portions for controlling the trajectory of the pills upon leaving the prescription and stock bottle slide portions; and a removable cover that covers the bowl depression of the upper housing portion and the bowl received within the depression.

13. Apparatus as claimed in claim 12 wherein the guide includes a limiting portion for limiting movement of pills upwardly onto the annular ledge of the bowl.

* * * * *

UNITED STATES PATENT OFFICE
CERTIFICATE OF CORRECTION

Patent No. 4,013,192        Dated March 22, 1977

Inventor(s) Austin E. Pillon

It is certified that error appears in the above-identified patent and that said Letters Patent are hereby corrected as shown below:

Column 2, line 17 "sheild" should be --shield--.
Column 3, line 45 "closkwise" should be --clockwise--.
Column 4, line 46 "sheild" should be --shield--.
Column 6, line 58 "to stock" should be --or stock--.

Signed and Sealed this

*Eleventh* Day of *October 1977*

[SEAL]

Attest:

RUTH C. MASON
*Attesting Officer*

LUTRELLE F. PARKER
*Acting Commissioner of Patents and Trademarks*